May 11, 1948.  M. W. MUEHTER  2,441,502
UNIT TRANSMITTER AND SIGNALING SYSTEM
Original Filed Aug. 1, 1940  7 Sheets-Sheet 2

FIG. 2

INVENTOR
M.W. MUEHTER
BY W.C. Middleton
ATTORNEY

May 11, 1948. M. W. MUEHTER 2,441,502
UNIT TRANSMITTER AND SIGNALING SYSTEM
Original Filed Aug. 1, 1940 7 Sheets—Sheet 6

FIG. 6

N.W. TRANSMITTER

FIG. 7

F.A. TRANSMITTER

INVENTOR
M. W. MUEHTER
BY W.C. Middleton
ATTORNEY

May 11, 1948.  M. W. MUEHTER  2,441,502
UNIT TRANSMITTER AND SIGNALING SYSTEM
Original Filed Aug. 1, 1940   7 Sheets-Sheet 7

FIG. 8  SUPERVISORY TRANSMITTER RECORDING ALARM 433

FIG. 9  SUPERVISORY TRANSMITTER RECORDING RESTORED 433

FIG. 10  RECORDING NIGHTWATCH STATION-85

FIG. 11  WATER FLOW 346, ALARM SIDE

FIG. 12  WATER FLOW 346, RESTORATION SIDE

FIG. 13  RECORDING FIRE ALARM-ALARM 455 (SIX ROUNDS)

INVENTOR
M. W. MUEHTER
BY W. C. Meddleton
ATTORNEY

Patented May 11, 1948

2,441,502

UNITED STATES PATENT OFFICE 2,441,502

UNIT TRANSMITTER AND SIGNALING SYSTEM

Manfred W. Muehter, Nutley, N. J., assignor to American District Telegraph Company, Jersey City, N. J., a corporation of New Jersey Original application August 1, 1940, Serial No. 350,622, now Patent No. 2,390,222, dated December 4, 1945. Divided and this application November 14, 1945, Serial No. 628,562

6 Claims. (Cl. 177—367)

This invention relates to systems for operating printing recorders and more particularly to an improved signaling and recording system of the unit transmitter type based on the system disclosed in applicant's prior Patent No. 2,109,273, granted February 22, 1938. This application is a division of the applicant's application Ser. No. 350,622, filed August 1, 1940 now U. S. Patent 2,390,222 granted Dec. 4, 1945, for Unit transmitter printing and signaling systems.

The objects of the invention are to provide separate alarm and supervisory circuits, both working in conjunction with the same printer and providing for preferential operation of alarm signal transmitters. This increases the reliability of the more important alarm service, as all alarm transmitters are concentrated on their own circuit which will, therefore, be shorter and less exposed to troubles. The preferential feature insures that alarm signals will under all normal or trouble conditions be given first consideration in recording, thereby eliminating possible delay in reception.

Automatic trouble adjusting means are provided which, in the case of a break of one or all of the three circuit wires, adjust the system for operation under that condition. Independent means are provided for the alarm and the supervisory circuit and the system is capable of maintaining operation of all transmitters even with breaks in all of the three wires of both circuits at the same time. Automatic restoration is effected as soon as the particular circuit is repaired.

Another improvement relates to the mode of operation of certain types of transmitters arranged for transmission of repeated alarm signals, as in the case of waterflow transmitters. These transmitters are arranged with a code wheel having an "alarm" code on one side of the wheel and a "restoration" code on the other half as in the case of supervisory transmitters. If the transmitter is also arranged for three round alarm signal operation, for instance, the first round will come in as an alarm signal, the second as a restoration signal and the third again as an alarm signal, each signal being transmitted by one half of the wheel. An object of the present invention is to provide, at the receiving station, converting means for converting this "restoration" signal into an alarm signal and recording it as such, and perform same as an alarm signal, viz., tap out the code on the gongs. In case of a genuine restoration signal, only the one restoration signal is transmitted, and the converting means do not become effective. Thus the signal performs as required for a restoration signal and fails to tap out its code on the gongs, in which case the complete restoration signal will be transmitted at the higher speed. This arrangement considerably simplifies the design of these transmitters which would otherwise require a double set of code wheels and coding contacts and an additional geared controlling cam.

Various selective and other novel features will be apparent from the following representative description.

This system is called a unit transmitter system because it makes use of an individual transmitter for each alarm or supervisory device from which indications are required. Each transmitter is directly attached to the particular device which operates it. The various transmitters of a system are interconnected by means of one or more three-wire loop circuits which originate at and return to the control center.

The transmitters operate in conjunction with control equipment located at the control center in a non-interfering and successive manner to record a signal on a printer recorder at the control center and to perform other functions.

The transmitters are driven by current impulses from the control station. The basic type of transmitter is the supervisory type. It has two codes arranged on the circumference of its code wheel. One code is transmitted when the associated device is operated to its alarm condition and the other when it is restored to its normal position. The difference in the two codes consists in four additional teeth in the second digit for the restoration signal. The impulses transmitted are strong and weak, weak impulses representing spaces. The starting of the transmitter is controlled through a transfer cam switch, the position of which is reversed during the transmission of a signal, in conjunction with the transfer switch operated by the supervised device. Other transmitters will be referred to hereinafter. Code impulses from the transmitters control the impulse operated type carriers at the control station.

A delinquency indicator is provided consisting of a stepping mechanism which is advanced one step every minute and restored automatically when a night watch signal comes in. If the night watch signal fails to come in within the proper time interval, an associated transmitter may be operated to record a delinquency signal on the tape. Operation of a night watch box will then reset the delinquency indicator and record a restoration signal.

All supervisory signals, that is, signals from sprinkler supervisory devices and delinquency signals, are arranged to register on a totalizer which is advanced one step when one of the above-mentioned devices runs in an alarm signal and is moved back one step when one of the devices is restored to normal. It thus indicates at all times the number of abnormal supervisory devices.

A ground detector relay is connected to the center of the ungrounded battery. The other terminal of the relay coil is connected to ground. A ground on any external circuit will operate this detector relay and give a lamp and buzzer signal. The buzzer can be silenced by turning the associated lamp switch. When the ground is removed from the system, the light goes out and the buzzer rings again until silenced by turning the switch back to normal.

Since no other ground exists on the system except through the high resistance coil of the ground detector relay, a single ground will not interfere with the operation of the system especially as the ground connection is removed from the detector relay while a signal is being transmitted.

In the drawings, the figures show diagrams of the system, transmitters and signals.

Figs. 1 to 5 together show the control station, printing recorder and two types of transmitters.

The mechanical elements of the printer are similar to well known types of printing recorders and to those shown in my prior Patent 2,126,025, August 9, 1938, and the patent to Johnson et al. 2,172,511, September 12, 1939.

*Supervision*

Figures 1, 14:
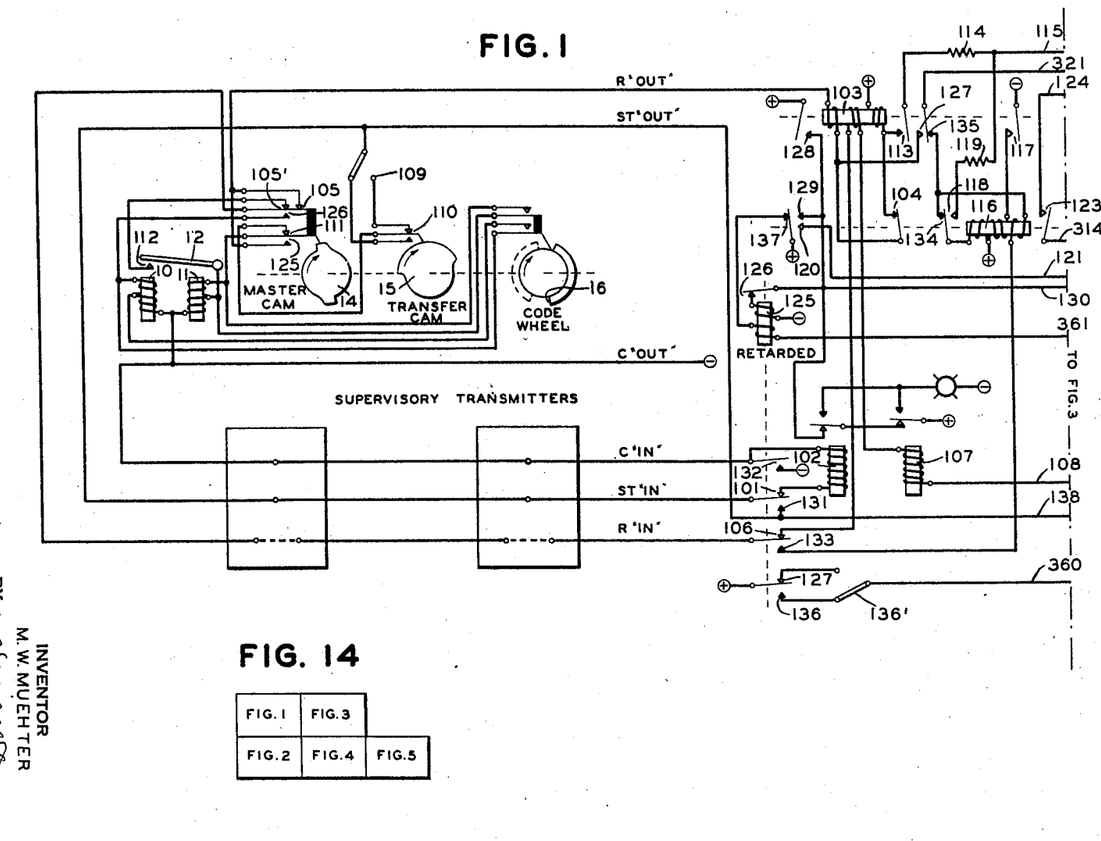
Fig. 1 shows the supervisory circuit and transmitters.
Fig. 14 is a diagram showing relative placement of the several figures of the drawing to form the complete circuit diagram. The basic principle of the transmitters and their operation are similar to those disclosed in the above-mentioned Patent 2,109,273.
Figure 3:
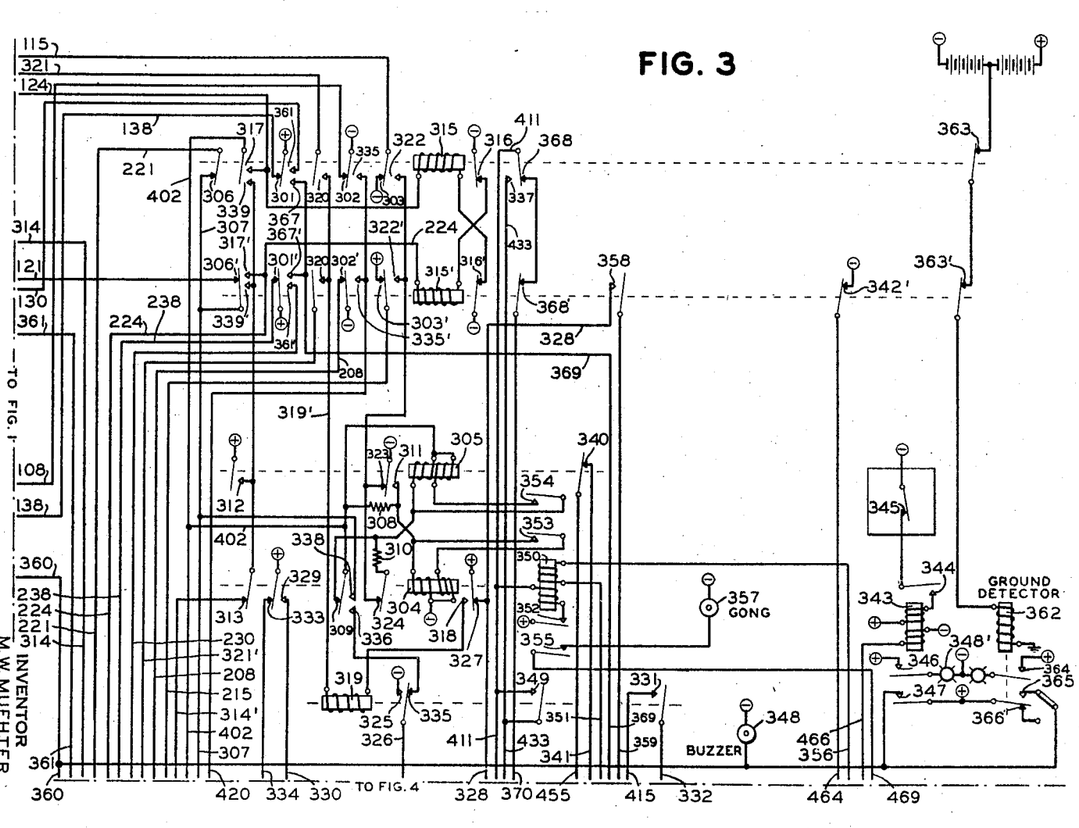
Fig. 3 shows principally the control station means for supplying the impulses to the transmitter circuit and the type carrier setting means.

The supervisory circuit for the common and starting lines of the supervisory transmitter circuit can be traced as follows: From plus battery through contact 301 (upper left of Fig. 3) over conductor 138, out over the ST loop and back to the control center, through make contact 101 of relay 125, through relay 102 over the C line to minus battery (Fig. 1). Relay 102 is normally held energized through this circuit to thereby supervise the ST and C lines.

The supervisory circuit for the R line can be traced from plus through the right hand winding of main starting relay 103 (upper right of Fig. 1), back contact 104, left hand winding of relay 103, through the R line, and corresponding contacts 105 (Fig. 1) of the line transmitters, back to the control center through make contact 106, through the middle winding of relay 103, through the coil of of relay 107 (lower right of Fig. 1), over conductor 108, through contact 302 (upper part of Fig. 3) to minus battery. Relay 107 (Fig. 1) is normally held energized in this circuit to thereby supervise the R line. Although current is flowing through all three windings of relay 103, it is to be noted that the middle winding has a number of turns equivalent in effect to the sum of the other two windings of relay 103 and is connected opposingly so that the effect on relay 103 is neutralized.

Figure 2:
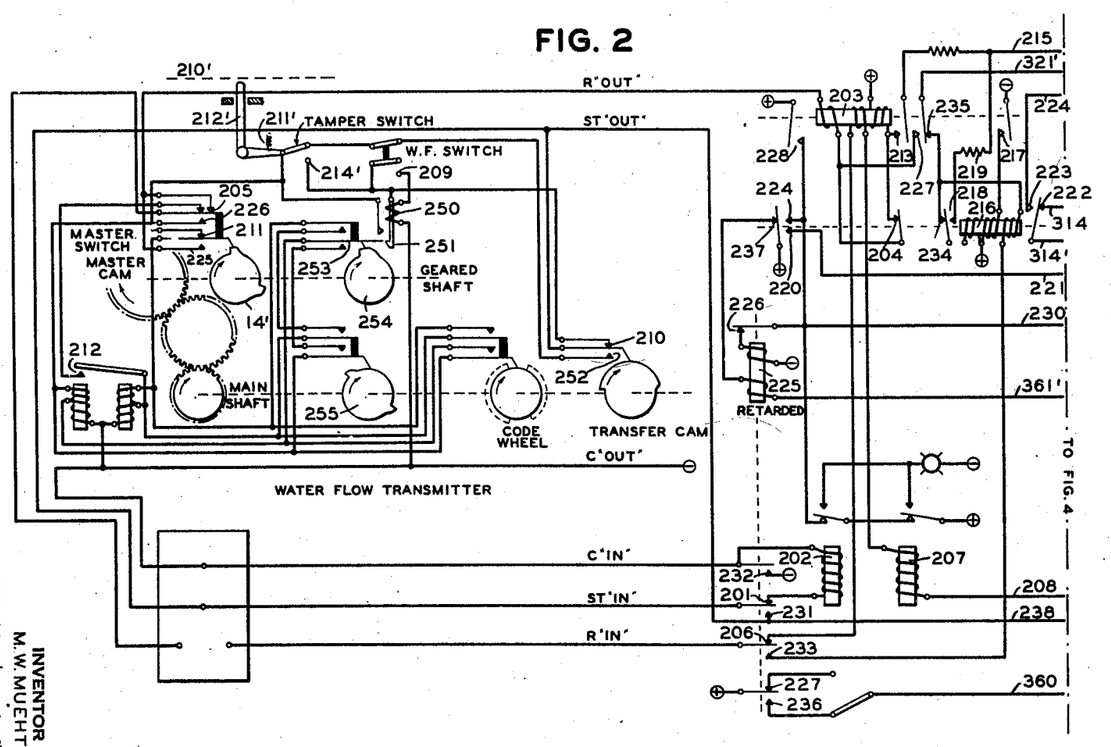
Fig. 2 shows the alarm circuit and transmitters.

Similar supervisory circuits can be traced for the alarm circuit involving supervisory relays 202 and 207 at the lower right of Fig. 2, as will be evident from the above.

*Transmitter start*

Figure 8:
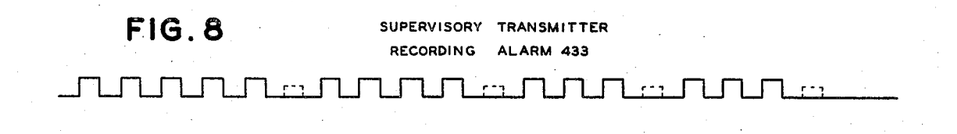
Figs. 8 to 13 are diagrams representing strong and weak impulses of types of signals as titled, the upper solid line portions representing strong impulses, the dotted lines representing weak impulses, the number stated being the transmitted number.
Figure 9:
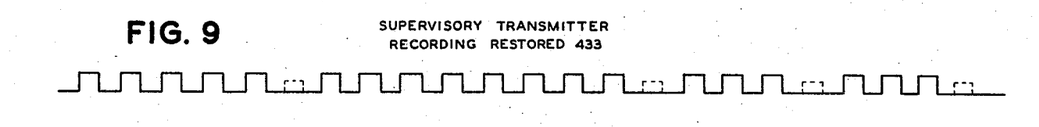

The transmitter of Fig. 1 is similar to that of applicant's Patent No. 2,109,273, above referred to, and comprises a pair of stepping motor magnets, 10 and 11, adapted to actuate the armature 12. A shaft carrying a master cam 14, a transfer cam 15 and a code wheel 16, which may be toothed on the alarm side as shown in Fig. 8, and on the restoration side as shown in Fig. 9, is rotated, step by step, by a pawl and ratchet, not shown, under the control of armature 12.

Assuming, by way of example, that the operation of the supervisory transmitter of Fig. 1, shown connected to the supervisory line ST at the upper left hand side of Fig. 1, is initiated by actuation to the right of the transfer element of the device switch 109 of the associated device to be supervised, a circuit will be closed from the ST line, where plus polarity of the battery is available at contact 301 (Fig. 3), as has been explained, through the device switch 109, the normally closed contact 110 of the transfer cam contact, through the normally closed master cam contact 111 of switch 126, and the right hand magnet coil of the transmitter to the C line where minus polarity is available as shown. The transmitter magnet is energized and attracts its armature closing its contact 112 and engaging the next tooth of the ratchet wheel preparatory to advancing it one step when subsequently deenergized. By closing contact 112, the R line is connected through contacts 105, 105', 112 and the armature 12 to the tap of the right hand transmitter coil and the current flow in the "out" side of the R line is considerably increased. This has the effect of increasing the current through the two outer windings of relay 103 to such a degree that relay 103 will pick up.

Relay 103 locks from plus in through its right hand winding, contact 113, resistor 114, over holding conductor 115 and through contact 303 of relay 315 to minus. Relay 103 also energizes relay 116 from minus through contact 117 and its middle winding. Relay 116 opens the running line at contact 104 and also locks in from plus through its left hand winding, make contact 118, resistor 119, to holding conductor 115. The break in the R line causes relay 107 to drop out and light a lamp 107' through an obvious circuit.

Start of pulsing relays

The main pulsing relay is 304 which operates in conjunction with relay 305. These relays start their operation as soon as contact 120 of relay 116 closes a circuit from plus over conductor 121, through contact 306' of relay 315', over conductor 307, through contact 401 of relay 432, over conductor 402, through resistor 308 and the left-hand winding of relay 304 to minus. Relay 304 operates and by opening its back contact 309 removes the shunt from the left-hand winding of relay 305 permitting it to operate from minus through resistor 3D, left hand winding of 305 to plus obtained from conductor 402 as traced above. When contact 311 of relay 305 closes, the winding of relay 304 is shunted out and relay 304 deenergizes with a slight delay. At this time a circuit is closed from plus through contact 312 of relay 305, contact 313, conductor 314', back contact 222, conductor 314, contact 123, over conductor 124 and through the coil of the supervisory master relay 315 and contact 316' to minus. Relay 315 operates. This relay closes a locking circuit for itself through contact 317 to plus over conductor 402 to keep itself energized when contact 312 of relay 305 or contact 313 of relay 304 opens. By opening its contact 301, relay 315 removes plus battery from the starting line ST causing the transmitter previously operated to release its armature and advance its ratchet wheel one step. It will be noticed that this happens after a time delay following the operation of relays 103 and 116, giving sufficient time to the transmitter magnet to operate properly and for other functions which will be subsequently explained. The opening of the starting line causes the release of relay 102.

The first step of the transmitter changes the position of the master cam contacts to the operated position. The right hand magnet coil of the transmitter is now connected to the "out" side of the running line R through contact 125 of switch 14 while the left hand magnet coil is connected to the "in" side of the running line R through contact 126 of switch 14. The running line R being open on the "out" side at contact 104 of relay 116, and on the "in" side at contact 302 of relay 315 which has been opened, no current is supplied to either of the coils of the transmitter at this time.

Impulses transmitted through the R line

Following the release of the main impulse relay 304 which energized relay 315, the coil of relay 305 is shunted by back contact 309 causing relay 305 to release with a slight delay. With contact 311 of relay 305 opening, the shunt is removed from relay 304 permitting it to energize again. At this time an impulse is transmitted to the transmitter, the circuit of which can be traced as follows: from plus through make contact 318 of relay 304, the coil of marginal operating relay 319, conductor 319', contact 320, over conductor 321, make contact 127 of relay 103, left hand winding of relay 103, the R line, in series with the master cam contacts similar to 105 of intermediate transmitters, if there are any, through contact 125 of the operated transmitter and its right hand magnet coil to the C line and minus. The transmitter magnet is thereby energized. As the code wheel contacts of the transmitter are not yet closed, this impulse will be of low intensity, not capable of operating the marginal relay 319. However, enough current flows through the left hand winding of relay 103 to keep it energized. It will now be shown that at this time relay 103 has to depend on this left hand winding for its energization. As the time relay 315 is energized, the locking circuit for the right hand winding of relay 103 is transferred from minus battery through contact 303 of relay 315 to minus battery through contacts 322 of relay 315 and 324 of relay 304, contact 323 of relay 305 in multiple with contact 324 being open at that time. It may be noted that contacts 303 and 322 are of the make-before-break type thus preventing momentary interruption of the holding circuit of relay 103 when relay 315 locks up. A short time after relay 304 is reenergized, at the time of the transmission of an impulse over the R line, relay 305 is also reenergized as relay 304 again removes the shunt from the winding of relay 305. Both contacts 323 and 324 are thus opened depriving the right hand winding of relay 103 of current. However, as indicated above relay 103 stays energized because of the current flowing through its left hand winding.

Relay 305 energizing again shunts the coil of main impulse relay 304 which drops out with a slight delay. This successive operation of relays 304 and 305 now continues for the full time of the signal transmission. Every time 304 releases, the line impulse is interrupted by the opening of its contact 318, and the transmitter releases advancing its ratchet wheel one step. Since back contact 324 of impulse relay 304 is arranged to close prior to the opening of front contact 318, the locking circuit for relay 103 is not even momentarily interrupted.

First coding impulse

In this way the transmitter will be operated step by step until the first tooth of the first digit of the code wheel closes its contacts shunting the upper portions of the transmitter magnet coils. The next impulse will, therefore, be of considerably greater intensity and will be a signal impulse sufficient to operate the marginal relay 319. By closing its make contact 325, relay 319 energizes the coding relay 403 from minus over conductor 326, through its two windings in series and to plus at conductor 307. Relay 403 locks in from minus through its contact 404 and its left hand winding to plus over conductor 307, which is now connected to plus as above explained. Fig. 8 shows an example of a supervisory alarm signal.

First impulse to printer

Figure 4:
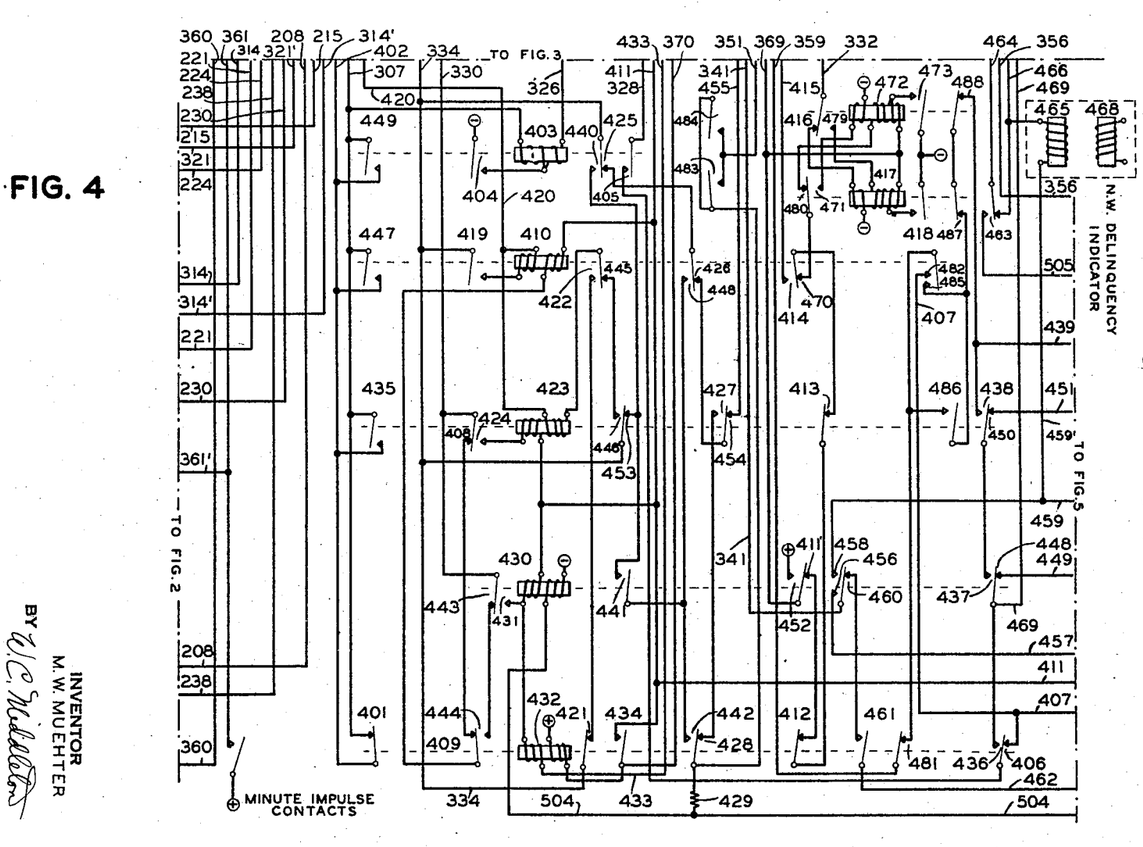
Fig. 4 shows principally the routing relays for supplying the impulses to the respective type-carrier setting means.
Figure 5:
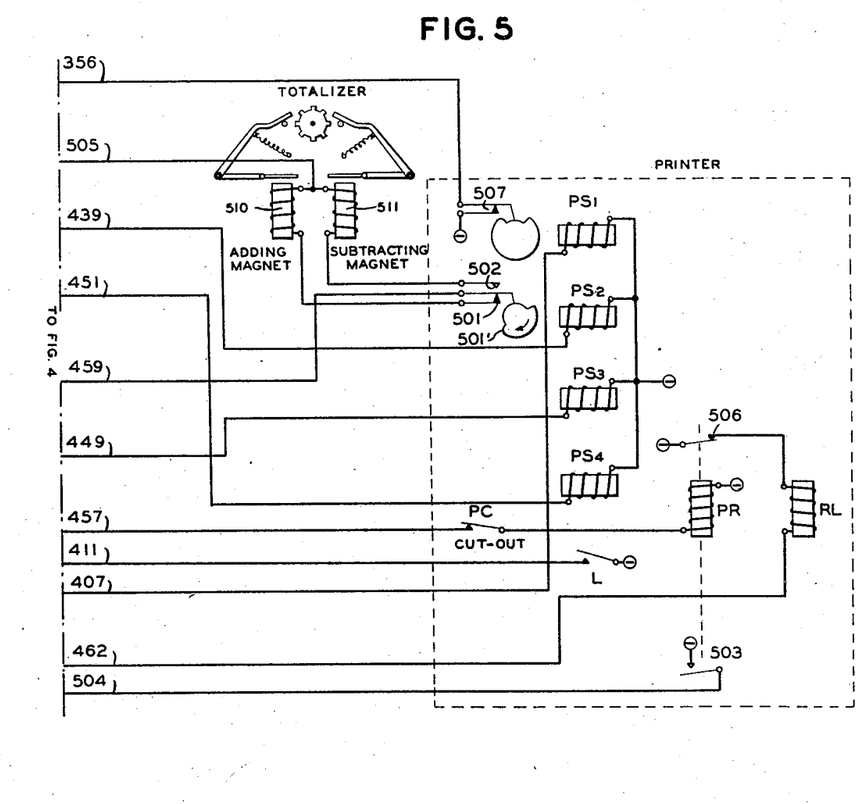
Fig. 5 shows the printer and totalizer.

When impulse relay 304 subsequently releases, the first digit type carrier stepping magnet PS1, Fig. 5, receives an impulse from plus through back contact 327 of relay 304, over conductor 328, contact 405 of relay 403, back contact 406 of the first shifting relay 432 (bottom of Fig. 4), conductor 407 and the coil of the first stepping magnet PS1 to minus. The latter advances its ratchet wheel one step and brings the stepping wheel retaining pawls into operative position to prevent retrograde movement and also closes latch contact L which stays closed until the printer has been reset to normal.

Sending coding impulse from supervisory transmitter

When impulse relay 304 is energized for the next line impulse, a circuit is also closed from plus through make contact 329 of relay 304, over wire 330, break contact 408 of relay 422, break contact 409 of relay 432, right hand winding of the routing relay 410, over conductor 411 and latch contact L of the printer to minus. Relay 410 is thus energized. As relay 319 is again energized, due to the fact that all supervisory transmitters have a number of consecutive teeth in the first digit, a circuit is closed from plus through contact 367 of relay 315 over conductor 369, contacts 411' of relay 430, 412 of relay 432, 413 of relay 423, 414 of energized relay 410, conductor 415, contact 331 of relay 319, conductor 332, contact 416 of relay 472 and the left hand winding of the first converting relay 417 to minus. Relay 417 is thus operated and locks in from minus through its contact 418 and right hand winding to plus over conductor 369.

When relay 304 subsequently releases, a circuit is closed from plus through its contact 333, over conductor 334, contact 419 of relay 410, the left hand winding of relay 410, over conductor 420 and through contact 335 of relay 315 to minus, thereby holding relay 410 energized. It is to be noted that contacts 329 and 333 of relay 304 are of the make-before-break type so that the circuit for the left hand winding of relay 410 will be closed before that of the other winding is opened. Another circuit is closed at this time from plus at conductor 334 through break contact 421 of relay 432, make contact 422 of relay 410 and through the right hand winding of relay 423, conductor 420 and contact 335 of relay 315 to minus, thus operating relay 423.

At the same time another impulse is transmitted to the first stepping magnet PS1, of the printer over the previously traced circuit through back contact 327 of relay 304.

*The third and following code impulses of first digit*

When the next impulse is transmitted to the line circuit back contact 333 of relay 304 is opened deenergizing the left hand winding of relay 410, and relay 410 releases since the previously traced operating circuit through make contact 329 of relay 304 and back contact 408 of the third shifting relay 423 for the right hand winding of relay 410 is no longer closed. However, relay 423 remains energized from plus at conductor 330, through contact 424 and the left hand winding of relay 423 to minus at conductor 411. When relay 304 releases again, another impulse is transmitted to the first stepping magnet PS1 of the printer. The former operating circuit of relay 423 is now open at contact 422 of deenergized relay 410, but another circuit is closed instead through contacts 445 of relay 410 and 446 of relay 423 to plus at conductor 334. The following impulses of the first digit will have no other effect except operating the transmitter and the first stepping magnet of the printer for additional steps. Relay 423 will remain energized through the right hand winding during the time the relay 304 is deenergized and through its left hand winding during the time relay 304 is energized.

*First shifting space*

When the space following the first digit group of teeth is brought into position opposite the coding wheel contacts, these will remain open and the subsequent line impulse will be of low intensity, as indicated at the sixth impulse of Fig. 8. This low intensity impulse is not capable of operating marginal relay 319 and the low intensity impulses correspond to the absences of impulses in most other systems, and are herein referred to as spaces as contrasted with the stronger signal impulses. Both windings of coding relay 403 will now be connected in multiple as follows: the right hand end of the winding is connected over conductor 326 through contacts 335 of relay 319 and 336 of relay 304, to plus at conductor 402, the left hand end being connected to plus at conductor 307, while the common in the middle is connected to minus through contact 404. The flux set up by the two equal windings will be of opposing direction neutralizing one another and cause relay 403 to release.

When relay 304 subsequently releases, a circuit is closed from plus through 333 of relay 304 over conductor 334, through contacts 425 of relays 403, 426 of relay 410, 427 of relay 423, 428 of relay 432, resistor 429, conductor 404, and through the right hand winding of the second shifting relay 430 to minus, operating relay 430. No impulse is transmitted to the printer at this time as contact 405 of relay 403 is open.

*Second digit*

The next impulse transmitted over the line will again be of a greater intensity as the first tooth of the second digit operates the code contacts to the closed position. Relays 319 and 403 are operated as before. The above traced circuit of relay 430 is interrupted at this time but another circuit is closed for its other winding from plus at conductor 330 through make contact 431 of relay 430, the left hand winding of relay 430 to minus at conductor 411, maintaining relay 430 in an energized position. At the same time, a circuit is closed for relay 432 from plus at contact 431 of relay 430, through the left hand winding of relay 432 over conductor 433, through contact 337 of relay 315 over conductor 411 and through latch contact L in the printer to minus, operating relay 432. This relay locks in from plus through its other winding and contact 434 to conductor 411 and contact L. Contact 401 opens but multiple contact 435 of relay 423 being closed, the circuit for the pulsing relays and relay 315 remains closed.

When relay 304 subsequently releases, an impulse is transmitted to the second stepping magnet PS2 of the printer from plus through contact 327 of relay 304, over conductor 328, through make contacts 405, 436 or relay 432, 437, 438, over conductor 439 and through the coil of the second stepping magnet PS2 to minus. Relay 430 is maintained energized through its right hand winding but now from plus at conductor 334 through make contacts 440 of relay 403, 441 of relay 430, and 442 of relay 432.

Subsequent code impulses will operate the transmitter and second stepping magnet of the printer for additional steps but no change in the routing relays 410, 423, 430, 432 will occur until the space following the second code digit causes the next shift impulse, relays 403, 423, 430, 432 remaining energized in the meantime.

*Third digit*

Relay 403 is deenergized when the low current impulse following the second code digit is transmitted over the line. When relay 304 releases following it, relay 430 is deenergized as the circuit of the right hand winding is opened due to the opening of contact 440 of relay 403.

When the next impulse is transmitted to the line circuit, the first tooth of the third digit closes the code wheel springs of the transmitter again, causing relays 319 and 403 to operate. At the same time the relay 410 is reenergized from plus at conductor 330 through contacts 443 of relay 430, contact 444 of relay 432, and the right hand winding of relay 410 to minus at conductor 411.

When relay 304 subsequently releases, relay 410 remains energized through its left hand winding and contact 419 as before. At the same time, relay 423 is deenergized since the circuit for its right hand winding is open at contacts 445 of relay 410 as well as 421 of relay 432. Contact 435 of relay 423 is opened but this has no effect since it is in multiple with contact 447 of relay 410 which is now closed, maintaining the operating circuit of the pulsing relays and relay 315 closed. Furthermore, an impulse is transmitted to the third stepping magnet PS3 of the printer which can be traced from plus through contact 327 of relay 304, over conductor 328, through contacts 405, 436, 448, over conductor 449, and the coil of the third magnet PS3 to minus. The following code impulses of the third digit will operate this stepping magnet and the transmitter for additional steps while the routing relays maintain their position with relays 410 and 432 energized.

Fourth digit

Following the third digit, a space is encountered by the code springs of the transmitter code wheel causing a low current impulse on the line, not capable of operating relay 319. Relay 403 releases. When relay 304 subsequently deenergizes, relay 430 is energized again from plus at conductor 334 through contacts 425 of relay 403, 448 of relay 410, 442 of relay 432, resistor 429 and right hand winding of relay 430 to minus.

When the next impulse is transmitted over the line, the first tooth of the fourth digit will cause operation of relays 319 and 403. At the same time relay 410 is deenergized as the circuit for its right hand winding is open at back contact 443 of relay 430. Relay 430, however, remains energized through its make contact 431 as earlier described.

Contact 447 of relay 410 is now open but is shunted by contact 449 of relay 403 thereby maintaining the circuit for the pulsing relays and relay 315 closed.

When relay 304 subsequently releases, an impulse is transmitted to the fourth stepping magnet PS4 of the printer from plus through back contact 327 of relay 304, over conductor 328 through contacts 405 of relay 403, 436 of relay 432, 437 of relay 430, 450 of relay 423, conductor 451 and the coil of the fourth stepping magnet PS4 to minus. The following impulses of the fourth digit advance this magnet and the transmitter a corresponding number of steps.

Printing and clearing operations

When a low current impulse is transmitted over the line due to the space following the last tooth of the fourth digit of the code wheel, relay 319 again fails to operate causing the release of relay 403. Contact 449 of relay 403 now opens but this has no immediate effect as it is shunted by contact 338 of relay 304. However, when the relay 304 subsequently releases, this shunt is removed. With the subsequent release of relay 305, there is an alternative path from plus through its contact 312 and 339 (of relay 315) for energizing the pulsing relays and the energizing circuit for relay 315 is opened at contact 312 causing the pulsing relays to cease operation and relay 315 to release. Contact 367 of relay 315 opens and removes plus from the holding conductor 369 of relay 417, but plus is still being supplied by contact 452 of relay 430 which is still energized from plus at conductor 334 through contacts 453 of relay 423, 441 of relay 430, 442 of relay 432, resistor 429 and the right hand winding of relay 430 to minus. At the instant relay 305 releases, a circuit is closed from plus through contact 333, conductor 334, contacts 425 of relay 403, 426 of relay 410, 454 of relay 423, over conductor 455, through contact 340 of relay 305, over conductor 341, through contact 456 of relay 430, over conductor 457, through the printer cut-out contact PC and the printer magnet PR to minus. The printer magnet is energized causing the signal already set up on the four typewheels of the printer to be printed on the tape.

The totalizer

At this time it may be explained that the second typewheel of the printer operates a cam 501' together with contacts 501 and 502. For the chosen designations of the printer wheels the cam 501' is so arranged that normally, and if magnet PS2 is operated for 1, 2, 3 or 4 steps, contact 501 is closed and 502 is open and if operated for more than 4 steps, contact 502 is closed and 501 is open. Assuming that magnet PS2 was operated 5 times (corresponding to an alarm signal with "3" as the first numeral of the device number) the following circuit can be traced at the time the imprint magnet is operated: from conductor 341 to which plus polarity was traced above, through contact 458 of relay 430 over conductor 459, through contact 501 and the adding magnet 510 of a so-called totalizer over conductor 505, through contact 463 of relay 417, conductor 464 and contact 342' of relay 315' to minus, operating the totalizer. The totalizer is a step-by-step device operating a common indicator shaft in either direction, depending on whether actuated by one or the other of its magnets. It is used to indicate the total number of supervisory devices in an abnormal condition at any given time. The second typewheel prints simple numbers in its first printing positions and duplicates these numbers with the indication "Rest.'" meaning restored at the other positions. Therefore, when the same transmitter which sent the signal of Fig. 8 sends a restoration signal (Fig. 9), the second digit would have 7 impulses. The second typewheel would then bring "Rest. 3" into printing position. The subtracting magnet of the totalizer would then be energized instead of the adding magnet, setting the indicator back one step.

A multiple circuit may also be traced from plus at conductor 459 through conductor 459' the resetting magnet 465 of the night watch delinquency indicator, which will be mentioned again later, over conductor 466 and through the lower winding of special attention relay 343 to minus. Magnet 465 does not operate in this circuit because of the high resistance of the winding of relay 343, but this relay does, locking in from plus through its upper winding, its contact 344 and contact 345 of relay 305 to minus. Through obvious circuits relay 343 operates a light 348' and a buzzer 348 by closing contacts 346 and 347.

Figure 6:
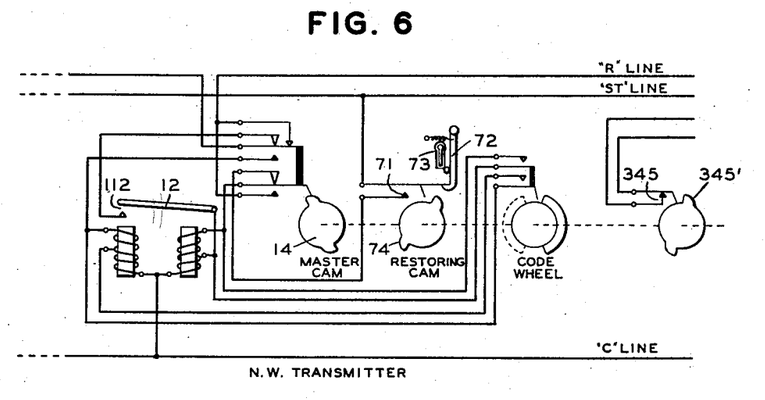
Figs. 6 and 7 respectively show the night-watch and fire-alarm transmitters.

This relay will stay energized and maintain its visual and audible signal until the attendant operates a key switch operating a transmitter which may be similar to that of Fig. 6 and which records an acknowledgment signal on the tape. Contact 345 of relay 305 is opened by hand or may be opened by this transmitter momentarily by means of a cam 345' (Fig. 6) on the transmitter shaft which operates near the end of the transmitter cycle, causing relay 343 to release. This switch and cam would not be present on the night watch transmitter mentioned hereinafter.

When the imprint magnet operates, it closes its contact 503 and connects minus battery over conductor 504 to the left end of the right hand winding of relay 430 causing a shunt across this winding and making it release with a slight delay. Contacts 456 and 458 open and deenergize the imprint and totalizer magnets, and the armature of the imprint magnet releases and operates means which move the paper tape forward one step.

Opening of contact 452 removes plus from locking conductor 369 of relay 417, causing it to release.

A circuit is now closed from plus at conductor 341 through contacts 460 of relay 430, 461 of relay 432, conductor 362, coil RL of the release magnet in the printer, through contact 506 to minus, operating the release magnet. This magnet releases and restores the printer typewheels to normal and opens latch contact L. The latter causes relay 432 to deenergize by opening the circuit of its right hand winding.

When contact 401 of relay 432 closes the circuit of the pulsing relays, these will start their operation with the energization of relay 304. It will be noted that the operation of the pulsing relays has been stopped until the completion of the printing and clearing operations of the recorder. This feature makes these operations reliable and independent of the speed and impulse duration of the pulser and in conjunction with the printer cut-out contact PC, which is arranged to open automatically when the printer head is lifted, for changing paper for instance, prevents further signals from going is without the possibility of mutilation of line impulses, which could occur, were the cut-out switch connected directly into the pulsing circuit. When relay 304 operates for the first time after restoration of the printer, no impulse is transmitted to the line as contact 320 of relay 315 is open. However, the starting relay 103 has been maintained energized as its locking circuit through its right hand winding, its contact 113, resistor 114 and conductor 115, has been transferred by contact 303 of relay 315 directly to minus. Subsequently, relay 305 is energized and 304 deenergized again. At this time the original operating circuit for relay 315 is closed from plus through contacts 312 of relay 305, 313 of relay 304, conductor 314', contact 222 of relay 216, Fig. 2, conductor 314, contact 123 of relay 116, conductor 124, coil of relay 315 and back contact 316' of relay 315' to minus, unless a signal is waiting to be recorded on the alarm circuit, in which case contact 222 is opened and 223 closed, as will be explained with more detail later in connection with the preferential arrangement for alarm signals. Assuming that this is not the case, relay 315 is energized and again locks in through its contact 317 to plus again available over conductor 402. Impulses are again transmitted through contact 127 of relay 103 to the R line circuit as contact 320 of relay 315 is now closed. Except in cases where there is only one space between the last tooth of the fourth digit of the transmitter code wheel and its following home position, the transmitter is at this time still in the running condition, i. e., with the master cam contacts in the operated position. The transmitter will again be operated by the line impulses which, however, will all be of low intensity since no more teeth are provided on the code wheel. Eventually the transmitter reaches its home position where the master cam 14' and its contacts are restored to the position as shown in the drawing and the R line circuit will be open except in a case where another transmitter is already connected to the R line waiting to transmit its signal, as will be explained later. The transmitter just operated is now again in its home position except that its transfer cam in the meantime has operated the transfer cam contact to the other side to be ready for a new start when the device switch is thrown back. In transmitting its signal, the transmitter code wheel has completed approximately one half revolution.

These above mentioned resetting impulses have no effect on the control center relays and printer. When the transmitter has disconnected itself from the running line and provided no other transmitter is already waiting on the R line to send its signal, the impulse circuit will be open when the next line impulse is transmitted. Relay 103 will release as its left hand winding will carry no current, the right hand winding likewise being deenergized since it in the meantime has been switched by contacts 303 and 322 of relay 315 from minus to minus through the contacts 323 and 324, of relays 305 and 304, respectively, by the reenergization of relay 315, and as both these contacts are then open. The circuit of the middle winding of relay 103 is also open, as contact 302 of relay 315 is open. Relay 103 deenergizes and causes relay 116 to release by opening contact 117 and breaking the circuit of the center winding of 116. The common circuit of the pulsing relays and relay 315 is at this time maintained energized from plus through contacts 312 of relay 305 and 339 of relay 315 in series but is opened at the time relay 305 releases the next time. When this happens, relay 315 restores to its normal deenergized position. The line circuit is now normal again and relays 102 and 107 pick up.

All relays are now in their normal position except relay 343 (right of Fig. 3); as explained above, it is deenergized by the operation of the acknowledgement transmitter.

The system is now ready for a new operation. If, for example, the device switch of the above-mentioned supervisory transmitter of Fig. 1 is thrown back to the position shown, a new starting circuit is closed through the other side of the transfer cam contact starting a new cycle in the manner described above. The only difference will be that a different code is transmitted, the restoration code having four more impulses in the second digit, as shown by Fig. 9, bringing the designation "Rest." in position to be printed.

*Night watch transmitter*

The operation of night watch transmitters (Fig. 6) which are also connected to the supervisory circuit, is the same as that of the supervisory transmitter as explained above except for the following points:

As shown by Fig. 6, the starting circuit is closed by a latch contact 71. This contact is closed when the associated latch 72 is tripped as the watchman operates the box with his key 73. The latch contact is restored to its normally open position by a restoring cam 74 near the end of the signal. As before mentioned, the switch 345 and cam 345' is not used when this transmitter is used as a night watch transmitter.

The first digit of the code of this transmitter consists of a single tooth followed by an extra space in addition to the ordinary digit space. As with the type wheel designations as chosen, the second wheel will ordinarily not be used for night watch signals, there will then be a third space (see Fig. 10) causing no impulses to be directed to the second printer wheel and a blank space on the tape in that particular column. This will be apparent from the following description.

The operation for the first high current impulse is the same as above described, the first printer stepping magnet receiving one impulse bringing the designation "night watch station" into printing position. When the space is encountered during the transmission of the next line impulse, however, relay 417 is not energized, as contact 331 of relay 319 is open, and will not subsequently be energized during this signal as its circuit will be open at one or the other of the series contacts, 414, 413, 412 and 411', all of which are only closed simultaneously during the transmission of the second line impulse. However, routing relay 410 is operated at this time over the same circuit as previously explained for supervisory transmitters. When relay 304 subsequently releases, relay 423 is energized likewise as before. No impulse is, however, transmitted to the first stepping magnet as relay 403 is deenergized and contact 405 open.

Due to the above mentioned additional space after the first tooth on the code wheel, the next line impulse is likewise of low intensity. However, relay 410 is deenergized at this time in the same way as explained for supervisory signals. When relay 304 subsequently deenergizes, relay 430 is energized likewise as before. As the following line impulse is again of low intensity, relays 319 and 403 will not operate but relay 432 will, through the same circuit as above traced for supervisory signals. Contact 405 of relay 403 being open, no impulse will, however, be directed to the second printer wheel when relay 304 subsequently releases. At that time relay 430 is deenergized as described above after the second code digit of supervisory signals. The following third and fourth impulse groups also operate in the same way. At the time the imprint magnet is energized, however, the circuit to the totalizer is not closed as make contact 463 of relay 417 is open. A shunt is also applied to the lower winding of relay 343 from minus through contact 342' of relay 315', conductor 464, contact 467 of relay 417 to conductor 466. Thus, when plus is applied over contact 458 of relay 430 to the lower end of the coil of the night watch delinquency indicator reset magnet, as previously described, relay 343 fails to operate. The resistance of its winding being eliminated from the circuit of the reset magnet 465, current of sufficient intensity will flow to operate it and reset the night watch delinquency indicator back to zero. The Hopkins Patents No. 1,942,814 and No. 1,942,815 show delinquency indicators. As the delinquency indicator itself does not form part of this invention, it need only be mentioned that the minute impulses magnet 468 operates a pawl mechanism which advances the main movable element of the delinquency alarm toward an alarm position which will be reached if the night watch transmitter does not operate and energize reset magnet 465 (as explained above) in time to prevent it. If the alarm position is reached, said movable element will operate a special transmitter constructed and connected as in Fig. 1. To this end, said movable element will push the leftwardly biased transfer element of the starting switch to contact 109, and record a delinquency alarm on the tape and on the totalizer, as above explained of the supervisory transmitter.

Should the night watch signal subsequently come in, the delinquency reset magnet 465 will be energized, allowing said movable element and said transfer element to restore to normal.

Fire alarm transmitter

Figure 7:
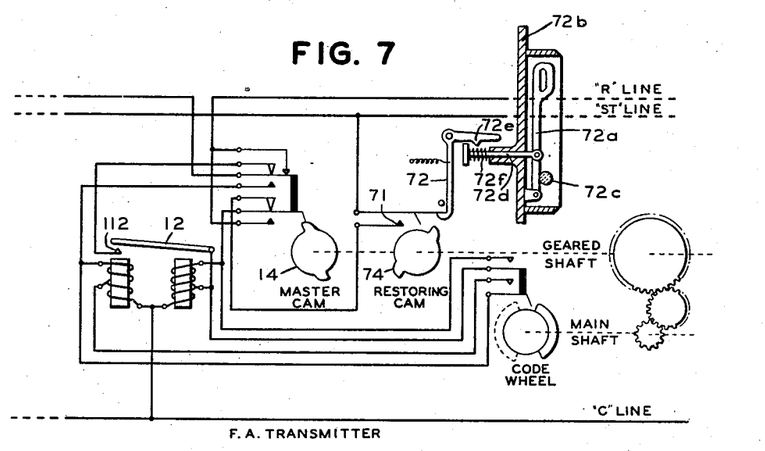

The fire alarm transmitter shown in Fig. 7 is very similar to the night watch transmitter. Being one of the alarm transmitters, it is connected to the alarm circuit. It is actuated by a latch arranged to close contact 71. The latch 72 is tripped when the operator pulls on the lever 72a provided on the front of the station housing 72b. This breaks the glass rod 72c, and then withdraws the plunger 72d against the cam 72e of the latch 72, thus releasing the latch 72. The spring 72f restores the lever, and the switch 71 is restored to the normal position by the restoring cam 74 after transmission, even though the glass rod has not been replaced. Subsequent operation can be obtained by pulling on the lever, even though the glass rod has not yet been restored. This transmitter is equipped with gears to provide for a multiple round signal, i. e., the restoring and master cams and contacts are operated by a geared shaft which is geared to the main or motor shaft in such a way that said contacts will be maintained in the operated position for six consecutive signals or three revolutions of the main or code wheel shaft, both sides of the code wheel having exactly the same code.

When the transmitter is started, due to the closing of the latch contact, it will operate the system in a similar way as explained above for the supervisory transmitters except that the operation will involve starting relays 203 and 216 and relays 202 and 207 (Fig. 2) instead of 103, 116, 102 and 107 (Fig. 1).

Start of pulsing relays for alarm signals

The pulsing relays are started by applying plus through contact 220 of relay 216, conductor 221, contact 306 of relay 315 to conductor 307 and 402. Again relay 304 is energized, then relay 305, then relay 304 is deenergized closing a circuit from plus through contacts 312, 313, conductor 314', contact 223 or relay 216, conductor 224, and through coil of relay 315' and contact 316 to minus, operating master alarm relay 315' which locks in to plus through contact 317', conductor 307, contact 306, conductor 221 and contact 220 of relay 216. Impulses are now transmitted to the running line R, of the alarm circuit through contact 320' of relay 315', the conditions exactly corresponding to those of the supervisory circuit as explained above.

Figures 12, 13:
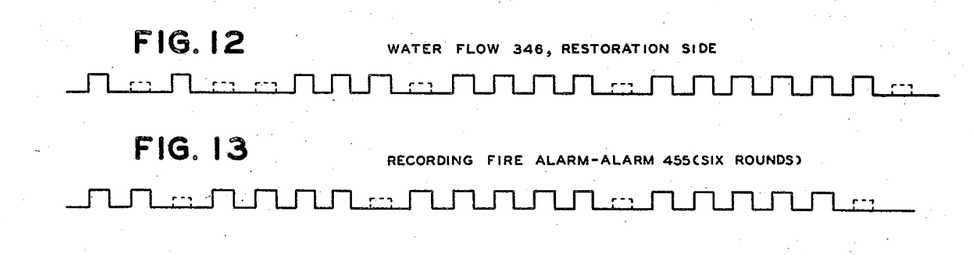

The first digit of the fire alarm code consists of two teeth followed by a single space (Fig. 13). It will be remembered that the fact whether or not there is a tooth after the first tooth of the first digit is decisive for operating the relay 417 or not. As there is a tooth in this case after the first one, the 417 relay will be operated, this time through contact 367' of relay 315', and conductor 369, instead of contact 367 as previously. Otherwise the operation is the same as explained above for supervisory transmitters with contact 335' taking the place of 335.

*Automatic speed change for gong operation*

When relay 430 is operated through resistor 499 and its right hand winding at the termination of the low current impulses following the first digit, relay 350 is operated in multiple therewith through contact 483 of relay 417 over conductor 351, its upper winding over conductor 356 and through contact 507 (Fig. 5) to minus. This contact is operated by a cam coupled to the first type wheel. Normally and in the first and second position, sometimes also in the third position, contact 507 is closed and open in the other positions. Relay 350 locks in from plus through its contact 352, its lower winding, conductor 411 and through the printer latch contact L to minus until the printer has been restored after recording the signals. By closing contacts 353 and 354, relay 350 connects another winding of relays 304 and 305 in multiple with their normal operating windings. The pulsing speed of the relays is thereby reduced to a degree as consistent for gong operation. This for the following reason: The timing of the impulses depends mainly on the release time of the relays. As the release is caused by reciprocal shunting of the windings, it is slow on account of the induction effect whereas the pickup is fast, representing a small percentage of the pulsing time. Now the decay of the flux in a shunted magnet follows the law $\phi = \phi_0 e^{-Rt/l}$ (where $\phi_0$ is the flux before shunting, $t$ the time in seconds, R the resistance and L the inductance of the winding) or $$t = \frac{L}{R} \text{ nat log } \frac{\phi_0}{\phi} = \frac{cn^2}{R} \text{ nat log } \frac{\phi_0}{\phi}$$

where $n$ is the number of turns and $c$ is a constant for a given relay). This formula shows that the release time of a shunted relay can be changed greatly by changing the resistance or number of turns of its winding or both.

With relay 350 operated, the impulses to the second, third and fourth stepping magnets of the printer will also operate gongs. The circuit for these stepping magnets was traced above through contact 436 of relay 432. From there a branch circuit extends over conductor 469, contact 355 of relay 350 and through the gong or gong conductor 367 to minus.

Otherwise the operation is as explained for supervisory transmitters except that relay 432 is operated during the first high current line impulse of the second digit through contact 349 of relay 319 instead of 337 of relay 315.

At the time the imprint magnet is operated, the circuit to the totalizer is not closed, as contact 342' of relay 315' is open. This contact also keeps the shunt across the lower winding of relay 343 open, so it will operate and give a special attention signal.

*Alarm transmitter maintained in operation after printing*

It will be recalled that relay 315 is deenergized at the time of the printing operation. This is not the case with 315' as its locking circuit through contact 317' is connected directly to conductor 307 which is now connected to plus at contact 220 of relay 216 as explained. However, the operation of the pulsing relays is stopped in the same way at this time as only relay 432 is energized and the contacts 401 of relay 432, 449 of relay 403, 447 of relay 410 and 435 of relay 423 are all open. The pulsing relays will, therefore, immediately start to transmit impulses over the line circuit when contact 401 of relay 432 closes following the printer resetting operation at which time the latch contact L opens and causes relay 432 to release. The locking circuit of relay 350 through conductor 411 and contact L, as explained above, is likewise deenergized. The higher speed of pulsing will then be resumed. At the same time, a circuit is closed from plus through contact 367' of relay 315', conductor 369, contacts 411' of relay 430, 412 of relay 432, 413 of relay 423, 470 of relay 410 and 471 of relay 417 and through the left hand winding of relay 472 to minus, operating relay 472 which locks in from minus through its contact 473 and right hand winding to conductor 369.

When the first high current impulse of the second round is transmitted, the operation starts again with relays 319 and 403 energizing as previously, etc. However, during the transmission of the second high current impulse, with relay 472 energized, a circuit is closed from plus at conductor 369, through contacts 411' of relay 430, 412, 413, 414, conductor 415, contact 331 of relay 319, conductor 332, contact 479 of relay 472, the middle winding of relay 417 to minus. This winding sets up an equal and opposing flux with respect to the right hand holding winding neutralizing the flux of the relay 417 and causing it to release.

The operating circuit for relay 350 during this round extends through contact 484 of relay 472 instead of 483 of relay 417. The rest of the operation is the same as for the first round.

When the printer has been reset after the second round, a similar circuit is closed for relay 472, which can be traced from conductor 369 through contacts 411—413, 470, 480, and the middle winding of relay 472 to minus. Middle and right hand winding neutralize one another causing relay 472 to release.

Relay 315' again remains energized. The third round operates exactly the same way as the first, operating relay 417 during the second code impulse and relay 472 after resetting the printer. The fourth round operates the same way as the second, deenergizing relay 417 during the second code impulse and relay 472 at the end of the signal. The fifth and sixth rounds operate exactly as the first and second respectively so that relays 417 and 472 will be restored to the normal deenergized position at the end of the alarm signals transmitted by the transmitter.

After the printer has been operated for the last recording, the transmitter is kept operating until it reaches its home position where the master cam contacts of the transmitter are restored to the position shown on the drawing. Unless another transmitter is already connected to the running line, the following line impulse will find the line open causing relays 203 and 216 to release in the same way as described above for relays 103 and 116 for the supervisory circuit. Contact 223 opens, and then relay 305 releases the next time, opening contact 312, the circuit of the pulsing relays will be open as well as that of relay 315' which releases.

*Waterflow signals*

The waterflow transmitter (Fig. 2) has a main motor and code wheel shaft and a geared shaft somewhat as in Fig. 6 and is adapted for restoration signals somewhat as in Fig. 1. It is also provided with means for giving an extra impulse for tamper signals.

The shafts are geared to given one rotation of the geared shaft to each two rotations of the main or motor shaft. As will be later explained, the code wheel gives waterflow signals during one and one-half rotations of the code wheel and a restoration signal during one-half rotation of the code wheel. This allows the transfer cam, which is preferably on the motor shaft, to operate to effect transfer within a movement of 180 and 360 degrees from normal and requires that the master cam 14' operate the master switch at 270 and 360 degrees from normal. Hence the master cam is not symmetrical.

The waterflow switch (Fig. 2) may be operated by a flow detector, as is well-known, and when operated a circuit is closed from plus available on the starting line ST through alarm contact 210 of the transfer cam 74' contact assembly, through the normally open contact 209 of the W. F. switch and through thermostat heater winding 250 to negative available on the C line. The thermostat 251 starts to heat up. In case the W. F. switch is momentarily operated on account of water hammer in the piping system it does not stay closed long enough to permit the thermostat to operate, which will then again cool off when the flow detector restores its switch to normal, and nothing further happens. This arrangement thus prevents false alarms which would otherwise be caused by surges in the water pipes.

In case of actual operation, the thermostat finally closes its contact 251 thereby energizing the transmitter from plus at the starting line through contacts 210, 251, 211 and the right hand magnet coil to negative available at the C line. Further operation for water flow is the same as described above of Fig. 1.

In operating, the thermostat element 251 also moves a latch under the tip of pen spring 253 preventing it from later closing the associated contacts when the tooth of cam 254 has been rotated out of the way. This feature will be more specifically referred to when discussing tamper signals. At the end of the water flow signals, the master cam 14' restores the master switch to normal.

Figures 10, 11:
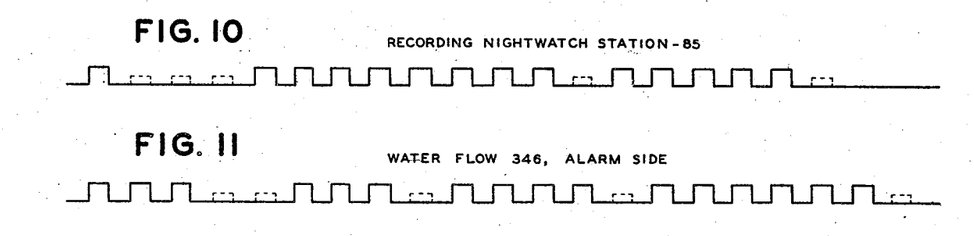

Water flow signals are arranged for repeated operation and in the disclosed form of the system three signals are transmitted. Like supervisory transmitters, the waterflow transmitters have to transmit a waterflow alarm signal and in addition a restoration signal when the waterflow switch restores to normal. The code wheel is cut for the alarm code on one side and the restoration code on the other side. This restoration code is, however, identical with the code on the alarm side except that the second tooth of the first digit is cut off. The first digit on the alarm side consists of three teeth followed by two spaces (Fig. 11). Arrangement is made for distinctive tamper signals. If the transmitter is operated on account of tamper, an additional high current impulse, later to be explained, is transmitted, by means of a cam and associated contacts, instead of the first spacing or low current impulse after the first digit of waterflow signals.

Waterflow alarm signals

The first round of alarm signals is transmitted by the alarm side of the code wheel. As just mentioned, the first digit of the alarm code consists of three teeth followed by two spaces. The second tooth, as previously explained will operate relay 417, in the same way as above explained. The first stepping magnet operates three steps bringing the type of the words "waterflow alarm" into printing position. When relay 304 releases following the transmission of the first low current or space impulse after the first digit, relay 430 is energized as usual, also relay 350 as for fire alarm signals, if contact 507 is arranged to be closed in position 3 of the first typewheel, i. e., if waterflow signals are to operate the gongs. The following impulse is again a low current impulse but relay 432 is not energized at this time as both contacts 337 of relay 315 and 349 of marginal relay 319 are open. It is, however, operated through contact 349 of relay 319 during the first high current impulse of the second digit, starting the operation of the second stepping magnet. The second, third and fourth digits operate in the same way as for fire alarm signals. If relay 350 is energized, these digits will also operate gong 357. Relay 472 is likewise operated at the end of the printer operation.

The waterflow transmitter is provided with gears which are arranged for a three-round alarm signal, i. e., one and one-half revolutions of the code wheel shaft. After the first alarm round has been recorded, the transmitter remains in operation and the second round is transmitted by the other side of the code wheel which is identical to the first except the second tooth of the first digit is missing as in Fig. 12. This means that the second line impulse will be of low current intensity and the circuit which causes relay 417 to release on the second round of a fire alarm signal is ineffective due to contact 331 of relay 319 being open. However, when relay 304 subsequently releases, an impulse is transmitted to the first stepping magnet although contact 405 is open. This circuit can be traced from plus through contacts 327 of relay 304, 358 of relay 315', conductor 359, contacts 481 of relay 432, 482 of relay 410, conductor 407 and through the coil of the first stepping magnet PS1 to minus so that the first stepping magnet will obtain three impulses as on the previous round. At the end of this signal, which otherwise operates the same as the first round, relay 472 is already energized and no change takes place as far as it is concerned. The transmitter continues to operate for its third round which again is transmitted by the same side of the code wheel as the first as in Fig. 11. The second code impulse is of high current intensity and causes relay 417 to release as explained above for the second round of fire alarm signals. Relay 350 is operated during this round through contact 484 of relay 472 instead of contact 483. At the end of the third round, relay 472 is deenergized in the same way as for the second round of fire alarm signals. After completing its cycle, the transmitter will restore its master cam contacts to the normal condition and cause the control center relays to restore as previously explained.

It will be noticed that at the end of the third round of alarm, both relays 417 and 472 are deenergized and ready for a new counting cycle.

Waterflow restoration signal

When the waterflow stops, the waterflow switch returns to the normal position as illustrated. A starting circuit can then be traced from line ST through restoration contact 252 of the restoration cam which is now closed (as the transfer cam has been shifted 540 degrees, 3 rounds of signals having been transmitted) through the normally closed contacts 209 of the W. F. switch and the tamper switch through contact 211 of the master switch and the right hand magnet to the C line. The code will now be transmitted by the restoration side of the code wheel as in Fig. 12. As will be recalled, the restoration code has a space following the first tooth. This means that relay 417 will not be operated during the tranmission of that particular impulse. However, as explained above, in connection with the second round of waterflow alarm signals, the first stepping magnet will nevertheless obtain three impulses.

In addition, a circuit for the second stepping magnet is simultaneously closed. This can be traced from plus through contacts 327 of relay 304, 352 of relay 315', conductor 359, contacts 481, 485, 487, 488 over conductor 439 and the coil of the second stepping magnet PS2 to minus. When the first printing magnet receives its third impulse, the second stepping magnet receives its second additional impulse, but through contact 486 of relay 423 instead of 485 of relay 419. It will furthermore receive two additional impulses when magnet 304 releases following the two low current space impulses after the first code digit. It will then be operated in the regular way controlled by the second code digit. It will be seen that the second stepping magnet thus receives a total of four additional special impulses which with the addition of the three regular impulses later received, serve to advance the typewheel to the restoration position. The rest of the operation is the same as explained before. As both contacts 483 and 484 of relays 417 and 472 respectively are open, relay 350 is not operated, the pulsing speed is not changed nor are the gongs operated. When the printer is reset, the transmitter continues to operate until it completes one half revolution. The master cam of the transmitter is cut in such a way that its contacts will resume their normal condition after the transmission of the restoration signal so that only one recording is obtained.

Waterflow tamper signals

If someone opens the transmitter housing 210', the tamper switch is moved to contact 214' by any suitable means, for instance a spring 211' when the housing releases the vertical rod 212' pivoted to an extension of the switch transfer element. This causes a distinctive tamper signal. In that case the starting circuit can be traced from the ST line through contact 210, the normally open contact 214' of the tamper switch, contact 211, and the right hand motor winding to line C.

As the transmitter starts with the thermostat in its normal condition, the latch operated by the thermostat in case of waterflow is not in position to engage pen spring 253. After cam 254 has been rotated slightly, pen spring 253 drops off the tooth and closes the associated contacts. It will be notice that the contacts of cam 255 are thereby connected in multiple with the coding contacts. The tooth of cam 255 is so arranged that the associated contacts are closed for one step immediately after the main coding contacts are opened at the end of the first digit of the code. An additional high current impulse is thus transmitted.

This causes the first typewheel of the printer to be advanced to the fourth position bringing "WF Tamper" into printing position. The rest of the operation is the same as for waterflow alarm signals. Relay 350 and the gongs are not operated as cam operated contact 501 (Fig. 5) is open in position 4 of the first typewheel.

Waterflow tamper restoration

When the tamper contacts are restored to the normally closed position, the transmitter is started as for waterflow restoration signals. However, the additional impulse will also be added at the end of the first digit again causing the designation "WF Tamper" to be recorded on the printer, otherwise the recording is as explained above for waterflow restoration signal.

Alarm signal precedence and non-interference and succession between alarm and supervisory circuit If an alarm transmitter is actuated at or about the same time as a transmitter connected to the supervisory circuit, it will take precedence over it. In this case both relays 116 and 216, which may here be called precedence relays, will be energized. The operation of the pulsing relays will be started with relay 304 pulling up, then relay 350 and then relay 304 releasing. A circuit is now closed from plus through contacts 312, 313, of relays 305 and 304, respectively, conductor 314', contact 223 of relay 216, conductor 224 and through the coil of alarm master relay 315' and back contact 316 of relay 315 to minus. Supervisory master relay 315 cannot operate as contact 222 of relay 216, which supplies plus to contact 123 of relay 116 over conductor 314, is open.

If a transmitter on the supervisory circuit is actuated first, it has to complete its signal in order to prevent interference but will let the alarm signal get in immediately after operating the printer. Assuming that while a transmitter is operating on the supervisory circuit, an alarm transmitter is actuated, relays 203 and 216 will be operated but relay 315' cannot be energized immediately as back contact 316 of relay 315 is open. When, however, relay 315 releases at the time of the printing operation, this contact closes again and relay 315' will operate as soon as the pulsing relays have started up and contact 312 of relay 305 closes. In this case the transmitter operated first on the supervisory circuit will not complete its cycle until after all alarm signals have been cleared. It will then complete its remaining steps bringing the master cam back to the home position. This latter operation has been explained above in connection with the description of the supervisory transmitter.

Non-interference and succession of transmitters on the same circuit

In case several transmitters are actuated on the same circuit at or about the same time they will be energized for the initial starting impulse for which current is derived from the ST line. When 315 or 315' operate, the starting line will be simultaneously deenergized by the opening of back contact 301 or 301' respectively; and the transmitters operate their master cam contacts to the running position. It will be seen that the transmitter located nearest to the "out" side of the R line will be the only one to receive line impulses over the running line. After transmitting its signal and returning to the home position, this transmitter restores the running line to its normal condition and impulses will now be directed to the second transmitter which again prevents impulses from reaching transmitters waiting further back on the line.

In case of this happening on the alarm circuit, the transmitters waiting will come in successively one after another without relay 315' releasing between. It has, however, been pointed out that the converting relays 417 and 472 are arranged to always complete a full cycle for each type of transmitter signal so as to be ready for a new counting cycle when a new transmitter starts to transmit.

*Automatic trouble adjusting means and operation under trouble conditions*

In case of a break on the ST or C line, the corresponding relay 102 or 202 is deenergized and closes a circuit for the trouble lamp 107'. Assuming that the break occurs on the supervisory circuit, for instance, the release of relay 102 or 107 or both, causes the deenergization of the normally energized upper winding of adjusting relay 125. Relay 125 releases and cannot be reoperated through this winding as contact 126 opens. This relay closes a circuit to the alarm buzzer 348 (right of Fig. 3) over conductor 360 by closing its back contact 136 (lower part of Fig. 1). The buzzer can be silenced by the operation of the corresponding silencing switch 136'.

In this connection it may be pointed out that in case of operation with the circuit at normal, relays 102 and 107 are also deenergized when the circuit of the starting and running line is interrupted by relays 116 and 315. However, relay 125 is held energized, as a multiple circuit is closed by contacts 128 of relay 103 and 129 of relay 116, also by contact 361 of relay 315 over conductor 130, keeping relay 125 energized during the transmission of the signal. After the release of relays 103, 116 and 315, relays 102 and 107 pick up again, closing the normal circuit for relay 125. As there is a slight interval of time between the restoration of the line circuits and the closing of the make contacts of relay 102 and 107, relay 125 is equipped with a copper slug in order to keep it energized during this interval. The arrangement for the alarm circuit is identical.

Relay 125 releasing in case of a break of a line conductor connects the two ends of the ST lines together and the two ends of the C lines together, respectively by contacts 131 and 132 so that plus and minus polarity respectively is fed to both ends of the respective circuits at the same time. Assuming now that a break in all three wires is the case of the trouble, which is the most severe condition, all transmitters connected to the circuit will still be able to obtain plus and minus polarity over the ST and C lines respectively for the initial starting step when actuated. A transmitter located between the break in the R line and its "out" side will operate in the usual way starting the operation of the system by operating relays 103 and 116. If, however, the transmitter is located between the break and the "in" side of the R line, the closing of the armature contact will not operate starting relay 103 but operates relay 116 directly through the "in" side of the R line, contact 133, the right hand winding of 116, contact 134 and the left hand winding of 116 to plus. Relay 116 operates and closes the holding circuit for its left hand winding through contact 118, resistor 119, over holding conductor 115 and through contact 303 to minus. As contacts 134 and 118 are of the make-before-break type, the circuit of relay 116 is never interrupted. Relay 116 starts the operation of the pulsing relays in the usual way. It will be seen, however, that impulses are now transmitted through back contact 135, the right hand winding of relay 116 and back contact 133 over the "in" side of the R line, through the master cam contact 126 of the transmitter, its left hand magnet coil and through the C line to minus. This magnet is capable of operating the transmitter in the same way as the right hand one. Otherwise, however, the operation is the same as under normal conditions. The right hand winding of relay 116 is similarly arranged as the left hand winding of 103 to hold relay 116 energized during the transmission of impulses. The left hand winding of 116, similarly as to the right hand winding of 103, is deprived of current during the time of impulse transmission due to contacts 303 of relay 315, 323 of relay 305 and 324 of relay 304 being open. This arrangement again serves the purpose of clearing the control center equipment when the transmitter gets off the line.

*Non-interference and succession on a circuit with line troubles*

The non-interference and successive operation is not affected by breaks in the ST and C lines. In case of a break in the R line, transmitters operated simultaneously between the break and the "out" side of the R line will operate in the standard way. In case of transmitters operated simultaneously between the break and the "in" side of the R line, the one nearest to the "in" side will transmit its signal, first operating the relay 116 or relay 216 directly as explained above. Otherwise the operation is the same as for normal conditions.

*Simultaneous operation of transmitters on opposite sides of a break in the R line*

If two or more transmitters are simultaneously actuated, for starting, on opposite sides of a break in the R line, the transmitters located between the break and the "out" side of the R line will operate the 103 relay and 116 relay in succession. Transmitters located between the break and the "in" side of the R line will directly operate the 116 relay as explained before. As the 116 relay breaks the operating circuit of the 103 relay by its contacts 104, the 103 relay may not have a chance to pick up if the transmitters are operated at exactly the same time. In that case, impulses will first be transmitted over the "in" side of the R line through back contact 135 of relay 103. After all the transmitters connected to that side of the circuit have transmitted their signal and the relay 116 is deenergized, relay 103 will be energized in series with the right hand coil of the transmitter nearest to the "out" side of the circuit. Relay 103 operates relay 116 which starts the operation. The transmitters located between the break and the "out" side of the circuit will then transmit their signals in succession. The same applies, of course, to relays 203 and 216 of the alarm circuit.

*Restoration of circuit to normal after remedying trouble condition*

When the line breaks have been repaired, relays 102 and 107 or 202 and 207, respectively, will, nevertheless, not pick up since relay 125 or 225 first has to restore the line circuit to its normal condition. These relays are provided with another winding (the lower ones). These windings are connected to the minute impulse contact over conductor 361 and are energized once every minute. The next minute impulse following the repair of the line circuit will cause the corresponding relay 125 or 225 to pick up. It will then lock in through its contact 126 or 226, respectively, as soon as the relays 102 and 107 or 202 and 207 pick up. At the end of the minute impulse, relay 125 or 225 will then stay energized leaving the circuit at normal.

When relay 125 or 225 operates, a circuit is closed for the buzzer through make contact 127 or 227 and the normally open side of the associated silencing switch which previously has been operated. By throwing the switch back to normal, the buzzer can be silenced. Relays 102 and 107 or 202 and 207 when operated, extinguish the lamp which was lighted when they released.

As a time impulse may come in during the transmission of a signal on an abnormal circuit, it must be prevented from causing interference by energizing the corresponding relay 125 or 225. This is obtained by connecting the restoring winding of these relays in series with a normally closed contact 137 or 237 respectively of the relays 116 or 216 respectively which contact will then be open.

From the above it will be clear that, if a transmitter starts after the line has been repaired but before the minute impulse has restored relays 125 or 225 respectively, the signal will nevertheless be received without fail.

*Ground supervision and operation with grounded lines*

The system is operated from an ungrounded battery. However, the center of the battery is connected through contacts 363, 363' and the coil of relay 362 to ground. If a ground occurs on any of the line wires, this relay will be operated and closing its contact 364 light a lamp. By closing its make contact 365, the buzzer 348 is operated. It can be silenced by operation of the associated silencing switch. Operation of the system with a single ground on the line wires does not interfere with the normal operation as the only other ground is through the very high resistance of relay 362. In addition this ground is removed as soon as relay 315 or 315' operate which then only leaves the accidental ground as the only one on the system. It will then have no effect at all.

If a ground occurs on two line wires simultaneously, it amounts to a short circuit between line wires and in most cases the line fuses will be blown except a ground on both the C line of the alarm and that of the supervisory circuit which will not interfere with the operation.

*Automatic clearing after disarrangement of equipment*

If in working on the relays etc. the serviceman should accidentally operate any of the relays, they will not lock in, as all locking circuits are arranged to function during operation only. Such accidental operation will, therefore, not affect a succeeding signal. Only the special alarm relay 343 can lock itself, but this is made noticeable immediately by the audible and visual signals and furthermore has no effect on succeeding signals. It can, of course, be restored in the usual way by operation of the acknowledgment key.

If the printer stepping magnets are manually operated, while the equipment is idle, relay 432 will be immediately energized from minus through the printer latch contact L, which will then be closed, over conductor 411, through contact 368 and 368' over conductor 370 and through the right hand winding of relay 432 to plus. This causes the operation of the printer release magnet RL through the same circuit as traced before. The release magnet restores all of the printer wheels to normal and opens the latch contact. The latter causes relay 432 to release again. It is therefore impossible to leave any part of the equipment in a condition that it will interfere with the proper reception of a subsequent signal.

Various modifications of the embodiment of the invention specifically described above will occur to those skilled in the art and may be made without departing from the scope of the invention as set forth in the appended claims.

What is claimed is:

1. A system comprising a series of transmitters, a main starting relay, a line normally connected at one end through the winding of the starting relay and to said transmitters, each transmitter comprising a motor and means for connecting said motor to said line to operate the relay, a second starting relay normally energized by the operation of the main starting relay, means set in operation by the operation of the second relay for sending motor current to the line, means set in operation by a line break to connect the other end of the line with the winding of the second starting relay to maintain the system in operative condition.

2. In combination, a series of transmitters, a control station including a source of current, a break detector relay and a main starting relay, a common line connected to the second pole of the source, a running line normally connected to the one pole of the source through the winding of the starting relay to said transmitters and the detector relay winding to the second pole, each transmitter comprising a motor, means for connecting said motor between the common line and the running line for changing the current in the relay winding to operate the relay, a second starting relay set in operation by the operation of the main starting relay, means set in operation by the operation of the second relay for sending motor-operating current to the running line, means operated by the deenergization of said detector relay from line break to disconnect the running line from the winding of said detector and connect it in series with a winding of the second starting relay, and a periodic means adapted at intervals to effect the restoration of the running line to normal if the second starting relay is unenergized.

3. A system comprising a transmitter circuit, means for adjusting the system to circuit defect, means periodically automatically restoring the system to normal if the defect has been cured and transmission is not in progress.

4. In combination, a source of current, first and second groups of transmitters, normally ungrounded lines connecting the transmitters from the respective poles of the source, first and second master means associated with said groups respectively, each adapted to be energized by the starting of a transmitter of its associated set and to supply operating current to the transmitters during signaling, a grounded ground-detector connected to the midpart of said source, and means for disconnecting the detector from said part if either of both master means are energized.

5. In a signaling system, a central station including a source of potential, a signaling circuit including a common loop circuit connected on one side to the negative side of said source, a starting loop circuit connected on one side to the positive side of said source and on the other side to the free end of the common loop circuit, and a running loop circuit connected across said source, at least one transmitter comprising motor coils, switching means for connecting a motor coil between the starting loop and the common loop, and a switch responsive to said coil for connecting at least a portion of said coil between the running loop and the common loop for increasing the current in the running loop, a main starting relay in the running loop for normally starting the transmitter in response to its connection, normally energized break detector relays connected in each of the loop circuits, a normally energized adjusting relay, contacts operated by the break detector relays for deenergizing said adjusting relay when a break occurs in the loops, contacts operated by the adjusting relay in case of breaks in the loops for connecting the ends of the starting loop and the ends of the common loop whereby negative polarity is connected to the common loop and positive polarity is connected to the starting loop, and the transmitter may operate the main starting relay if it is still connected thereto, an auxiliary starting relay, contacts operated by the adjusting relay for connecting the running loop to the auxiliary starting relay whereby the transmitter may operate if disconnected from the main starting relay and periodic impulsing means connected to the adjusting relay for operating it to restore the loops to normal when the break therein is repaired.

6. In a signaling system, a central station including a source of potential, a signaling circuit to said source, at least one transmitter comprising a motor, switching means for connecting the motor to the circuit, a main starting relay in the circuit for normally starting the transmitter in response to its connection, normally energized break detector relays connected in the circuit, a normally energized adjusting relay, contacts operated by the break detector relays for deenergizing said adjusting relay when a break occurs in the circuit, an auxiliary starting relay, contacts operated by the adjusting relay for connecting the circuit to the auxiliary starting relay whereby the transmitter may operate if disconnected from the main starting relay and periodic impulsing means connected to the adjusting relay for operating it to restore the loops to normal when the break therein is repaired.

MANFRED W. MUEHTER.

REFERENCES CITED

The following references are of record in the file of this patent:

UNITED STATES PATENTS

| Number | Name | Date |
| --- | --- | --- |
| 2,183,245 | Muehter | Dec. 12, 1939 |
| 2,259,960 | Muehter | Oct. 21, 1941 |